United States Patent
Sun et al.

(10) Patent No.: US 10,320,010 B2
(45) Date of Patent: Jun. 11, 2019

(54) THERMAL CONTROL SYSTEM FOR TRAMCAR

(71) Applicant: CRRC TANGSHAN CO., LTD., Tangshan (CN)

(72) Inventors: Bangcheng Sun, Tangshan (CN); Minggao Li, Tangshan (CN); Ming Li, Tangshan (CN); Lu Han, Tangshan (CN); Bin Liu, Tangshan (CN); Xiaoyan Zang, Tangshan (CN); Qi Li, Tangshan (CN); Qiumin Zhang, Tangshan (CN)

(73) Assignee: CRRC Tangshan Co., Ltd., Hebei (CN)

(*) Notice: Subject to any disclaimer, the term of this patent is extended or adjusted under 35 U.S.C. 154(b) by 191 days.

(21) Appl. No.: 15/359,546

(22) Filed: Nov. 22, 2016

(65) Prior Publication Data
US 2017/0077529 A1 Mar. 16, 2017

Related U.S. Application Data

(63) Continuation of application No. PCT/CN2014/090376, filed on Nov. 5, 2014.

(30) Foreign Application Priority Data

May 26, 2014 (CN) .......................... 2014 1 0225156

(51) Int. Cl.
*H01M 8/00* (2016.01)
*H01M 8/04014* (2016.01)
(Continued)

(52) U.S. Cl.
CPC .... *H01M 8/04014* (2013.01); *B61D 27/0018* (2013.01); *H01M 8/04029* (2013.01);
(Continued)

(58) Field of Classification Search
CPC ...................................................... H01M 8/00
See application file for complete search history.

(56) References Cited

U.S. PATENT DOCUMENTS

| 2,869,333 | A | * | 1/1959 | Hoiby | ............... B60H 1/3226 62/239 |
| 3,315,488 | A | * | 4/1967 | Lind | ............... B60H 1/00378 62/241 |

(Continued)

FOREIGN PATENT DOCUMENTS

| CN | 101522447 A | 9/2009 |
| CN | 102780052 A | 11/2012 |

(Continued)

OTHER PUBLICATIONS

The extended European Search Report of corresponding European patent application No. 14893075.3, dated Nov. 3, 2017.

(Continued)

*Primary Examiner* — James A Shriver, II
*Assistant Examiner* — James J Triggs
(74) *Attorney, Agent, or Firm* — J.C. Patents

(57) ABSTRACT

Disclosed is a thermal control system for a tramcar. The system includes a roof profile (11) arranged above a compartment roof of the tramcar (10); a fuel cell system (12) and an air-conditioning system (14) arranged above the roof profile (11); and a heat dissipating system (13) arranged above the roof profile (11), where the fuel cell system (12) communicates with the heat dissipating system (13) via a piping (16), and the piping (16) is arranged with a circulating pump (15) for pumping a coolant to the heat dissipating system. The thermal control system solves the problem of low heat dissipating efficiency of a fuel cell in the prior art.

6 Claims, 3 Drawing Sheets

(51) Int. Cl.
*H01M 10/625* (2014.01)
*H01M 10/6568* (2014.01)
*H01M 10/65* (2014.01)
*B61D 27/00* (2006.01)
*H01M 8/04029* (2016.01)
*H01M 8/04007* (2016.01)
*B60H 1/00* (2006.01)

(52) U.S. Cl.
CPC ..... *H01M 8/04067* (2013.01); *H01M 10/625* (2015.04); *H01M 10/65* (2015.04); *H01M 10/6568* (2015.04); *B60H 1/00* (2013.01); *H01M 2250/20* (2013.01); *Y02T 30/42* (2013.01); *Y02T 90/32* (2013.01)

(56) References Cited

U.S. PATENT DOCUMENTS

| | | | | |
|---|---|---|---|---|
| 4,217,764 A | * | 8/1980 | Armbruster | B60H 1/3226 62/239 |
| 6,445,080 B1 | * | 9/2002 | Daqoa | B60K 1/04 307/10.1 |
| 6,548,199 B1 | * | 4/2003 | Tanaka | B60L 11/1881 180/65.31 |
| 6,777,115 B2 | * | 8/2004 | Reiser | H01M 8/04223 429/429 |
| 8,302,997 B2 | * | 11/2012 | Veenstra | B60K 15/07 137/267 |
| 9,121,342 B2 | * | 9/2015 | Oslislok | B60H 1/00264 |
| 9,160,222 B1 | * | 10/2015 | Kim | H02K 47/00 |
| 2005/0092005 A1 | * | 5/2005 | Wunderlich | B60H 1/00207 62/244 |
| 2007/0126238 A1 | * | 6/2007 | Augusto | F03D 1/02 290/52 |
| 2008/0156809 A1 | * | 7/2008 | Mizuno | B60K 15/07 220/562 |
| 2011/0259930 A1 | * | 10/2011 | Rossel | B60K 1/04 224/309 |

FOREIGN PATENT DOCUMENTS

| | | |
|---|---|---|
| CN | 203134927 U | 8/2013 |
| CN | 103502032 A | 1/2014 |
| CN | 103996890 A | 8/2014 |
| DE | 11 2006 000 136 T5 | 11/2007 |
| DE | 10 2007 012 893 A1 | 3/2008 |
| DE | 10 2007 046 367 A1 | 4/2009 |
| EP | 1 527 919 A1 | 5/2005 |
| JP | 4075634 B2 | 4/2008 |
| WO | WO 2013/150797 A1 | 10/2013 |

OTHER PUBLICATIONS

International Search Report of corresponding International PCT Application No. PCT/CN2014/090376, dated Feb. 26, 2015.

* cited by examiner

THERMAL CONTROL SYSTEM FOR TRAMCAR

CROSS-REFERENCE TO RELATED APPLICATIONS

This application is a continuation of International Application No. PCT/CN2014/090376, filed on Nov. 5, 2014, which claims the priority benefit of China Patent Application No. 201410225156.X, filed on May 26, 2014. The contents of the above identified applications are incorporated herein by reference in their entireties.

TECHNICAL FIELD

The present disclosure relates to a tramcar manufacturing technology, and particularly, to a thermal control system for tramcar.

BACKGROUND

In recent years, environment pollutions, oil resource depletion and global warming have driven people to seek technical break-through in the field of new energy power system. Decision makers in many cities in our country are beginning to plan tramcar construction projects, with power gridless areas being deployed in critical sections in order to preserve urban landscapes. Under the circumstance of high speed of rail transit and popularization of urban rail transit, achievements of energy-saving, environment-friendliness, safety and reliability by researches on energy storage technologies and smart control strategies will be modernization signs of rail transit technology in the new century. For the purpose of achieving friendly and harmonious development of human, environment and vehicles, countries around the world are actively exploring new energy sources, which are bound to become a development trend of future tramcars.

At present, energy storage units maturely applied in hybrid power systems mainly include two categories: super capacitor and power battery. The super capacitor has high power density and is characterized by rapidly charging/discharging, satisfying the power level required by high acceleration and efficiently recovering braking energy. The power battery has high energy density, and is characterized by continuously discharging, satisfying huge energy requirements for long distance travelling and moderately recovering braking energy. Other than these, fuel cells, which are zero-emission, energy saving and environmentally-friendly new energy, have also become a focus and hot spot of technology researches of hybrid power cars and rail vehicle. Hence, a hybrid power system using a fuel cell, a power battery and a super capacitor in a tramcar has become the core of researches. However, said hybrid power system would release a large amount of heat when providing power for the tramcar. Especially, the fuel cell has the maximum heat release, for example, a fuel cell with rated power output of 150 kiloWatt (kW) could release as much as 120-150 kW heat. To dissipate this part of heat, a highly effective heat dissipating device would be desirable.

In prior art, water cooling technologies are employed to reduce temperature of the energy storage units. This, however, has low heat dissipation efficiency, and thus is unable to meet high heat dissipation requirements of the fuel cell.

SUMMARY

Embodiments of the present disclosure provide a thermal control system for a tramcar, in order to solve the problem of low heat dissipation efficiency in the prior art.

An embodiment of the present disclosure provides a thermal control system for a tramcar, including a roof profile arranged above a compartment roof of the tramcar, and a fuel cell system and an air-conditioning system arranged above the roof profile, characterized in that the thermal control system further includes:

a heat dissipating system arranged above the roof profile that is connected with the fuel cell system via a piping, the piping being provided with a circulating pump for pumping a coolant to the heat dissipating system.

Further, a heat-conducting medium is provided between the heat dissipating system and the roof profile, transferring, to the roof profile, heat of the coolant outputted from the fuel cell system.

Further, the roof profile is internally arranged with a hollow air duct that is configured to form convection between the heat of the coolant transferred to the roof profile and cold air produced by the air-conditioning system.

Further, a through-hole is arranged in the roof profile near the heat dissipating system, the through-hole being configured to input the cold air produced by the air-conditioning system into the heat dissipating system, thereby creating a heat exchange between the coolant and the cold air.

In these embodiments of the present disclosure, the thermal control systems for a tramcar can eliminate the heat generated by the fuel cell system via a heat dissipating system, thereby reducing coolant temperature rapidly and efficiently, while satisfying heat dissipation requirement of the fuel cell.

BRIEF DESCRIPTION OF DRAWINGS

A brief description will be given hereinafter with reference to the accompanying drawings used in the description of the embodiments of the present disclosure or prior art in order to explain the technical resolutions of the embodiments or prior art more clearly. Apparently, the drawings described below are merely illustrating some embodiments of the present disclosure, those skilled in the art may obtain other drawings according to these drawings without paying any creative labor.

DETAILED DESCRIPTION

In order to make objects, technical solutions and advantages of embodiments of the present disclosure clearer, the technical solutions in the embodiments of the present disclosure will be described hereunder clearly and completely with reference to accompanying drawings. Obviously, the described embodiments are only a part of embodiments of the present disclosure, rather than all of them. Any other embodiments obtained by persons skilled in the art based on the embodiments of the present disclosure herein without making any creative effort shall fall into the protection scope of the present disclosure.

Figure 1:
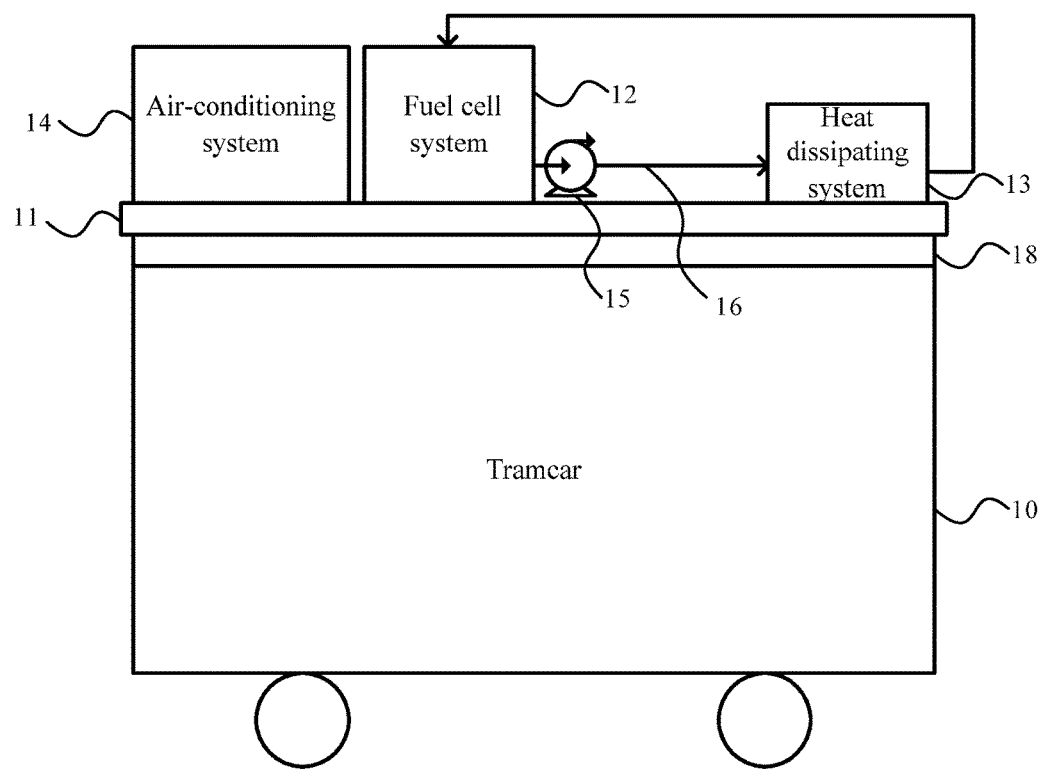
FIG. 1 is a side view of a schematic structure of a first embodiment of the thermal control system for a tramcar according to the present disclosure.
Figure 2:
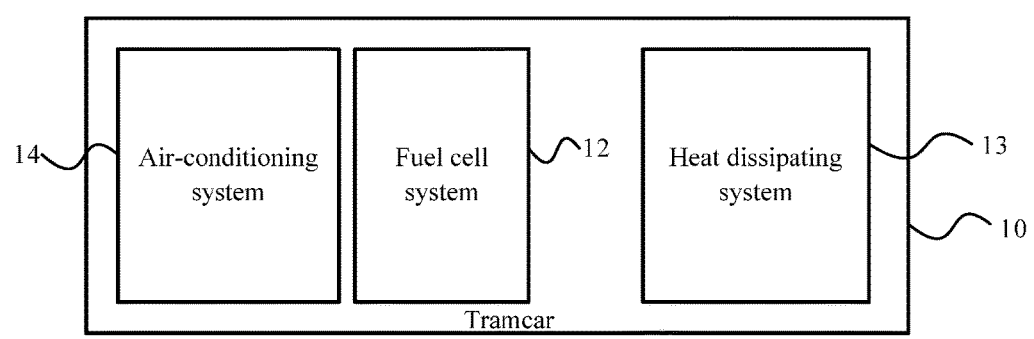
FIG. 2 is a top view of a schematic structure of the first embodiment of the thermal control system for a tramcar according to the present disclosure.

FIG. 1 is a side view of a schematic structure of a first embodiment of the thermal control system for a tramcar according to the present disclosure, and FIG. 2 is a top view of a schematic structure of the first embodiment of the thermal control system for a tramcar according to the present disclosure. Referring to FIG. 1 in conjunction with FIG. 2, a roof profile 11 is arranged above the compartment roof of a tramcar 10. A fuel cell system 12 and an air-conditioning system 14 are arranged above the roof profile 11. In the compartment, an air-conditioning duct 18 for supplying air into the compartment is arranged beneath the compartment roof. In the present embodiment, the thermal control system may further include: a heat dissipating system 13 arranged above the roof profile 11 and connected with the fuel cell system 12 via a piping 16, the piping 16 being provided with a circulating pump 15 for pumping a coolant to the heat dissipating system 13. Furthermore, another piping may be provided for inputting the coolant cooled by the heat dissipating system 13 into the fuel cell system 12.

Optionally, a piping may be provided to make the coolant outputted from the fuel cell system 12, via the circulating pump 15, directly back into the fuel cell system 12 without going through the heat dissipating system 13. This applies to the situation where the coolant fails to reach a predetermined temperature after exchanging heat with the fuel cell system 12, and hence requires no air cooling.

In the present embodiment, the fuel cell system 12 is configured to supply power for the tramcar and eliminate self-generated heat through the coolant; the heat dissipating system 13 is configured to reduce temperature of the coolant outputted from the fuel cell system via air cooling technology and then supply the coolant to the fuel cell system for recycling; the air-conditioning system 14 is configured to produce cold air in the air-conditioning duct 18.

The fuel cell system, which is the power system of the tramcar, generates a huge amount of heat, making rapid and efficient heat elimination for the fuel cell system become a focal point. In the present embodiment, heat generated by the fuel cell system is removed by circulation flow of the coolant, and thus the coolant outputted from the fuel cell system has a high temperature. Driven by the circulating pump, the high temperature coolant flows into the heat dissipating system, the heat dissipating system has heat exchanging capability, and dissipates the heat of the high temperature coolant by air-cooling technology. Specifically, the heat dissipating system may include, such as, an iron or aluminum block, and drive air in the surrounding environment to flow via a fan. The flowing air is suctioned into the heat dissipating system, thereby creating heat exchange between the flowing air and the high temperature coolant, and cooling the coolant. The cooled coolant circulates back into the fuel cell system, and begins another cycle of removing the heat from the fuel cell system.

In the present embodiment, the heat dissipating system is used to eliminate the heat generated by the fuel cell system, thereby reducing coolant temperature rapidly and efficiently, while satisfying heat dissipation requirement of the fuel cell system.

Figure 3:
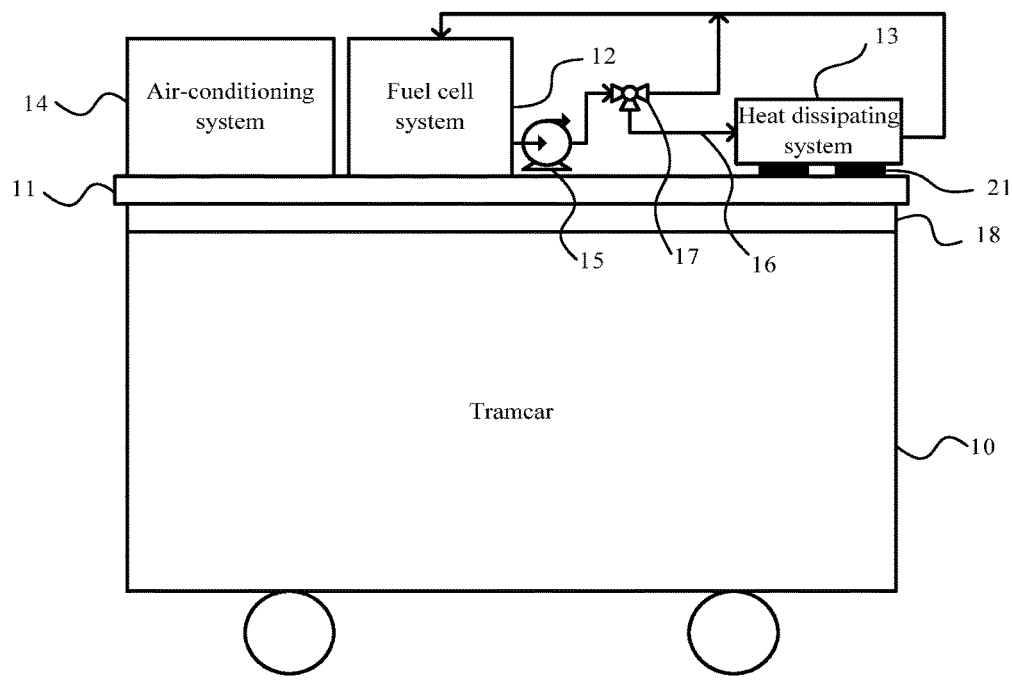
FIG. 3 is a side view of a schematic structure of a second embodiment of the thermal control system for a tramcar according to the present disclosure.

FIG. 3 is a side view of a schematic structure of a second embodiment of the thermal control system for a tramcar according to the present disclosure. As shown in FIG. 3, on basis of the structure of the thermal control system shown in FIG. 1, further, a heat-conducting medium 21 is provided between the heat dissipating system 13 and the roof profile 11, for transferring the heat of the coolant outputted from the fuel cell system 12 to the roof profile 11, so as to increase heat dissipation area and speed up heat dissipation. The thermal control system of the present embodiment is applicable in both winter and summer. A three port valve 17 is used for connecting an outlet of the circulating pump 15 to the heat dissipating system 13 and the piping leading to the fuel cell system 12, respectively.

In the thermal control system of the present embodiment, the heat-conducting medium 21 may be any medium with heat conduction function, such as the thermally conductive silica gel. The heat-conducting medium 21 may conduct heat from the heat dissipating system to the roof profile, or even the entire body surface of the tramcar. In a conventional approach, only the heat dissipating system is used to dissipate the heat, and in this case, when the temperature of the coolant is too high, the capacity of the heat dissipating system may become insufficient, causing that only part of the heat in the coolant is dissipated. Instead, if the heat in the coolant is diffused to additional media with larger areas, such as the roof profile and body surface of the tramcar, heat dissipating area can be expanded, thus heat dissipating rate is increased.

In the present embodiment, the heat dissipating system is combined with the roof profile and the body surface of the tramcar, effectively utilizing the body surface with a large area to expand heat dissipating area, thus reducing coolant temperature more rapidly and efficiently, while satisfying heat dissipation requirement of the fuel cell system.

Figure 4:
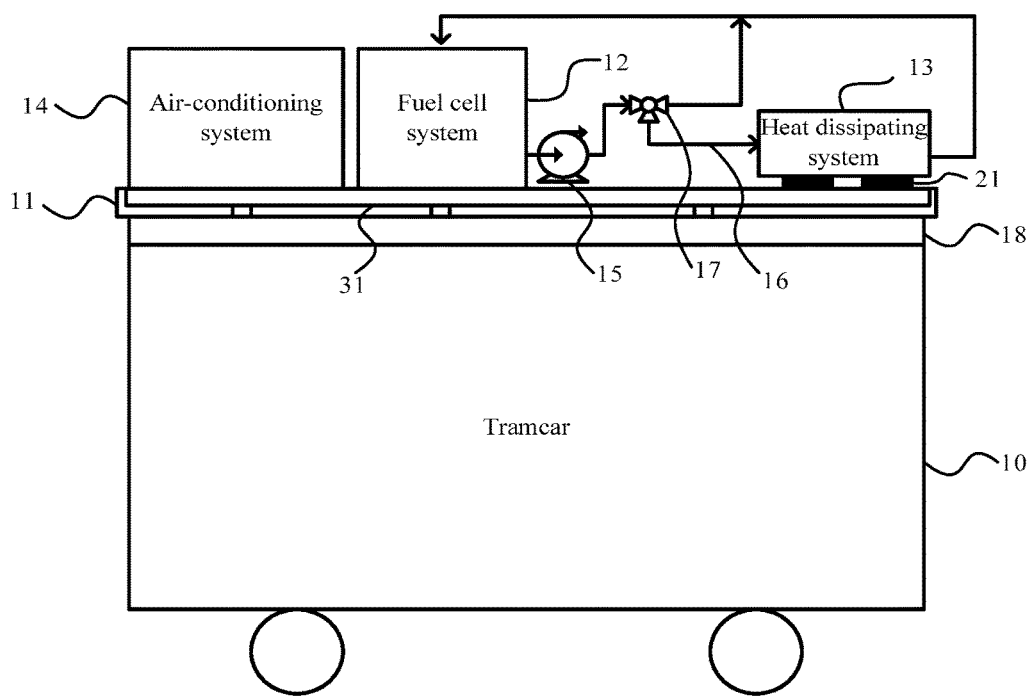
FIG. 4 is a side view of a schematic structure of a third embodiment of the thermal control system for a tramcar according to the present disclosure.

FIG. 4 is a side view of a schematic structure of a third embodiment of the thermal control system for a tramcar according to the present disclosure. As shown in FIG. 4, on basis of the structure of the thermal control system shown in FIG. 3, further, a hollow air duct 31 is arranged within the roof profile 11. Through a vertical hole in the hollow air duct 31, cold air from the air-conditioning duct 18 is introduced into the hollow air duct 31, and flows along a horizontal air duct therein, forming convection between the heat of the coolant transferred to the roof profile 11 and the cold air, so that heat may be dissipated rapidly. Optionally, a small fan may be arranged at one side of the roof profile 11 so as to drive the air flow to create a convection. The thermal control system of the present embodiment is suitable for use in summer.

In the thermal control system of the present embodiment, the hollow air duct in the roof profile is used to create air convection between hot air formed from the coolant transferred to the roof profile and cold air from the air-conditioning duct beneath the roof profile. The hot air and the cold air conduct heat exchange through the convection in the hollow air duct, thereby further increasing heat exchanging efficiency by using, on basis of expanding heat dissipating area described in the previous embodiment, the cold air produced by the air conditioning system to carry away part of the heat from the tramcar body.

In the present embodiment, the heat dissipating system is combined with the roof profile, tramcar body surface, and the cold air produced by the air conditioning system, effectively utilizing the body surface with a larger area to expand heat dissipating area, as well as using the cold air as part of a cooling unit so as to enhance heat exchanging effect, thus reducing coolant temperature more rapidly and efficiently, while satisfying heat dissipation requirement of the fuel cell system.

Figure 5:
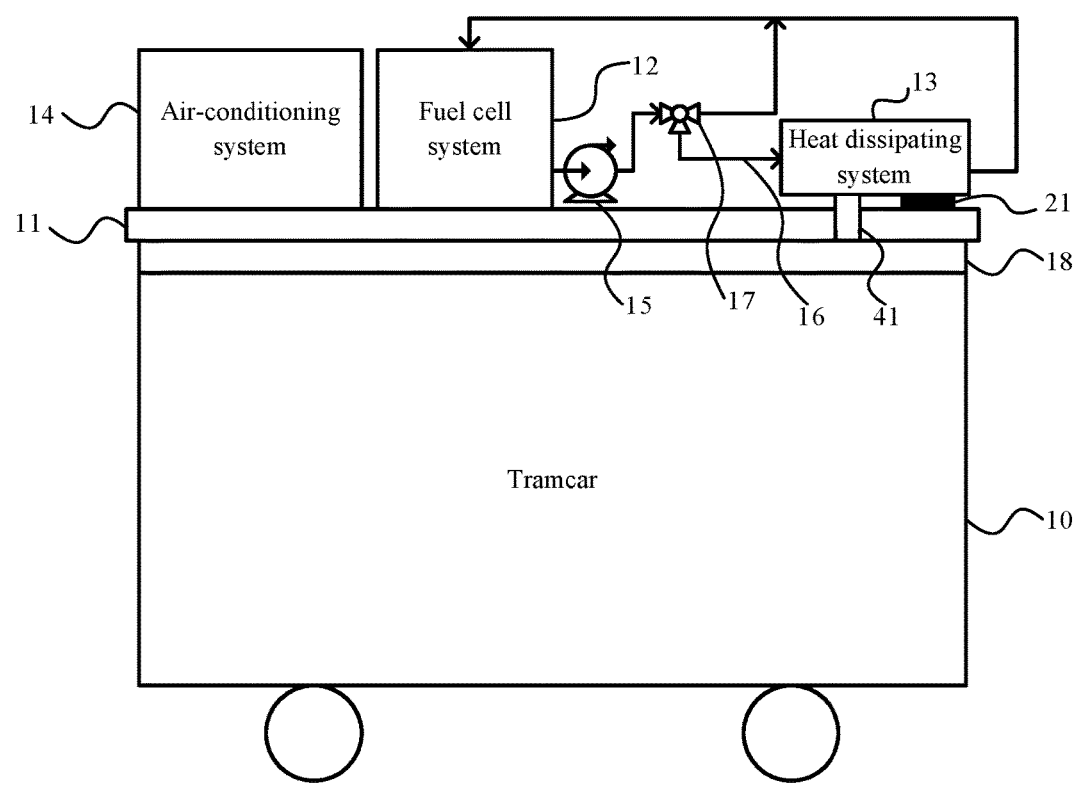
FIG. 5 is a side view of a schematic structure of a fourth embodiment of the thermal control system for a tramcar according to the present disclosure.

FIG. 5 is a side view of a schematic structure of a fourth embodiment of the thermal control system for a tramcar according to the present disclosure. As shown in FIG. 5, on basis of the structure of the thermal control system shown in FIG. 3, further, a through-hole 41 is arranged in the roof profile 11 near the heat dissipating system 13. The through-hole 41 makes the heat dissipating system 13 communicate with the air-conditioning duct 18, and is used to input cold air from the air-conditioning duct 18 into the heat dissipating system 13, forming a heat exchange between the coolant and the cold air, so that heat may be dissipated rapidly. The thermal control system of the present embodiment is suitable for use in summer.

The through-hole 41 in the present embodiment differs from the hollow air duct 31 in the previous embodiment in that: the through-hole 41 is punched through the roof profile 11, vertically reaching the top and bottom surfaces of the roof profile 11, and may directly communicate with the air-conditioning duct 18 and the heat dissipating system 13, while the hollow air duct 31 is a hollow structure inside the roof profile 11 and exclusively contained in the interior of the roof profile 11 without extending to the top and bottom surfaces of the roof profile 11, that is, the hollow air duct 31 is a cavity formed between the top and bottom surfaces of the roof profile 11.

In the thermal control system of the present embodiment, the cold air produced by the air conditioning system is utilized to directly cool the hot coolant in the heat dissipating system. This is similar to heat dissipation by cold plates, has great heat exchanging efficiency and in addition, avoids problem of the fuel cell system with regard to sealing caused by externally sourced air cooling, and improves protection rating and reliability of the fuel cell system, thereby reducing coolant temperature rapidly and efficiently, while satisfying heat dissipation requirement of the fuel cell system.

Optionally, if the thermal control system of the above embodiment is applied to the super capacitor and power battery box that equipped in the tramcar, cooling capacity may be utilized more efficiently during the summer.

Finally, it should be explained that the foregoing embodiments are merely intended to describe, rather than limit, technical solutions of the present disclosure. Although the present disclosure is described in detail with reference to the foregoing embodiments, persons of ordinary skill in the art should understand that they may still make modifications to the technical solutions described in the foregoing embodiments, or make equivalent replacements to some or all of technical features therein; however, these modifications or replacements will not make the essence of corresponding technical solutions depart from the scope of the technical solutions in the embodiments of the present disclosure.

What is claimed is:

1. A thermal control system for a tramcar, comprising a roof profile arranged above a compartment roof of the tramcar, and a fuel cell system and an air-conditioning system arranged above the roof profile, the thermal control system further comprising:
    a heat dissipating system arranged above the roof profile that is connected with the fuel cell system via a piping, the piping being provided with a circulating pump for pumping a coolant to the heat dissipating system,
    wherein a heat-conducting medium is arranged between the heat dissipating system and the roof profile, to transfer, to the roof profile, heat of the coolant outputted from the fuel cell system; and wherein the roof profile is internally arranged with a hollow air duct that is configured to form convection between the heat of the coolant transferred to the roof profile from the coolant and cold air produced by the air-conditioning system.

2. The system according to claim 1, wherein a through-hole is arranged in the roof profile near the heat dissipating system, and the through-hole is configured to input the cold air produced by the air-conditioning system into the heat dissipating system, creating a heat exchange between the coolant and the cold air.

3. The system according to claim 1, wherein a through-hole is arranged in the roof profile near the heat dissipating system, and the through-hole is configured to input the cold air produced by the air-conditioning system into the heat dissipating system, creating a heat exchange between the coolant and the cold air.

4. The system according to claim 1, wherein a through-hole is arranged in the roof profile near the heat dissipating system, and the through-hole is configured to input the cold air produced by the air-conditioning system into the heat dissipating system, creating a heat exchange between the coolant and the cold air.

5. The system according to claim 1, wherein a vertical hole connected with an air-conditioning duct is arranged in the hollow air duct, wherein the air-conditioning duct is arranged beneath the compartment roof and in a compartment.

6. The system according to claim 1, wherein an outlet of the circulating pump is connected with a three port valve, which is used for connecting the outlet of the circulating pump to the heat dissipating system and a piping leading to the fuel cell system, respectively.

* * * * *